United States Patent [19]

Shepherd

[11] Patent Number: 5,419,575
[45] Date of Patent: May 30, 1995

[54] STABILIZER SYSTEM FOR VEHICLES

[76] Inventor: Donald W. Shepherd, 5 Cherry Lane, Dringhouses, York Y02 20H, England

[21] Appl. No.: 721,523
[22] PCT Filed: Feb. 26, 1990
[86] PCT No.: PCT/GB90/00296
§ 371 Date: Jul. 11, 1991
§ 102(e) Date: Jul. 11, 1991
[87] PCT Pub. No.: WO90/09918
PCT Pub. Date: Sep. 7, 1990

[30] Foreign Application Priority Data

Feb. 27, 1989 [GB] United Kingdom ............... 8904430

[51] Int. Cl.6 ............................................. B62H 1/12
[52] U.S. Cl. ..................................... 280/302; 280/293
[58] Field of Search ............... 280/293, 301, 302, 303, 280/299, 300, 304

[56] References Cited

U.S. PATENT DOCUMENTS

| 502,298 | 8/1893 | Hyams | 280/302 |
|---|---|---|---|
| 1,107,427 | 8/1914 | Kasdorff | 280/302 |
| 1,154,089 | 9/1915 | Bryant | 280/302 |
| 1,251,684 | 1/1918 | Murray | 280/302 |
| 3,877,727 | 4/1975 | Johannsen | 280/301 |

FOREIGN PATENT DOCUMENTS

| 40170 | 5/1929 | Denmark | 280/302 |
|---|---|---|---|
| 352817 | 6/1905 | France | 280/302 |
| 162265 | 7/1905 | Germany | 280/302 |
| 169700 | 4/1906 | Germany | 280/302 |
| 174152 | 8/1906 | Germany | 280/302 |
| 697355 | 10/1940 | Germany | 280/293 |
| 1294249 | 4/1969 | Germany | |
| 2810343 | 9/1979 | Germany | |
| 15374 | 2/1927 | Netherlands | |
| 282990 | 1/1965 | Netherlands | 280/293 |
| 2117336 | 10/1983 | United Kingdom | 280/293 |
| 00337 | 2/1984 | WIPO | |
| 9009918 | 9/1990 | WIPO | 280/293 |

*Primary Examiner*—Mitchell J. Hill
*Attorney, Agent, or Firm*—Price, Heneveld, Cooper, Dewitt & Lipton

[57] ABSTRACT

A stabiliser system, primarily for supporting a pedal bicycle and its rider upright at the halt, comprises a spring-loaded telescopic arm (25) pivoted at its upper end adjacent the rear wheel spindle (12) and having at its lower end a cross-shaft (26) carrying stabiliser wheels (27). The arm can be lowered by back-pedalling to draw a cable (22) onto a spool (31) on the pedal spindle (18). The cross-shaft also carries a flanged roller (51). When the arm is lowered by back-pedalling as the rider comes to a halt, the cross-shaft (26) is drawn beneath the rear wheel and the tire (13) is engaged by the roller and the rear wheel is lifted off the ground, a large part of the weight of the rider being transferred to the ground through the rear wheel, the roller, the cross-shaft and the stabiliser wheels.

30 Claims, 5 Drawing Sheets

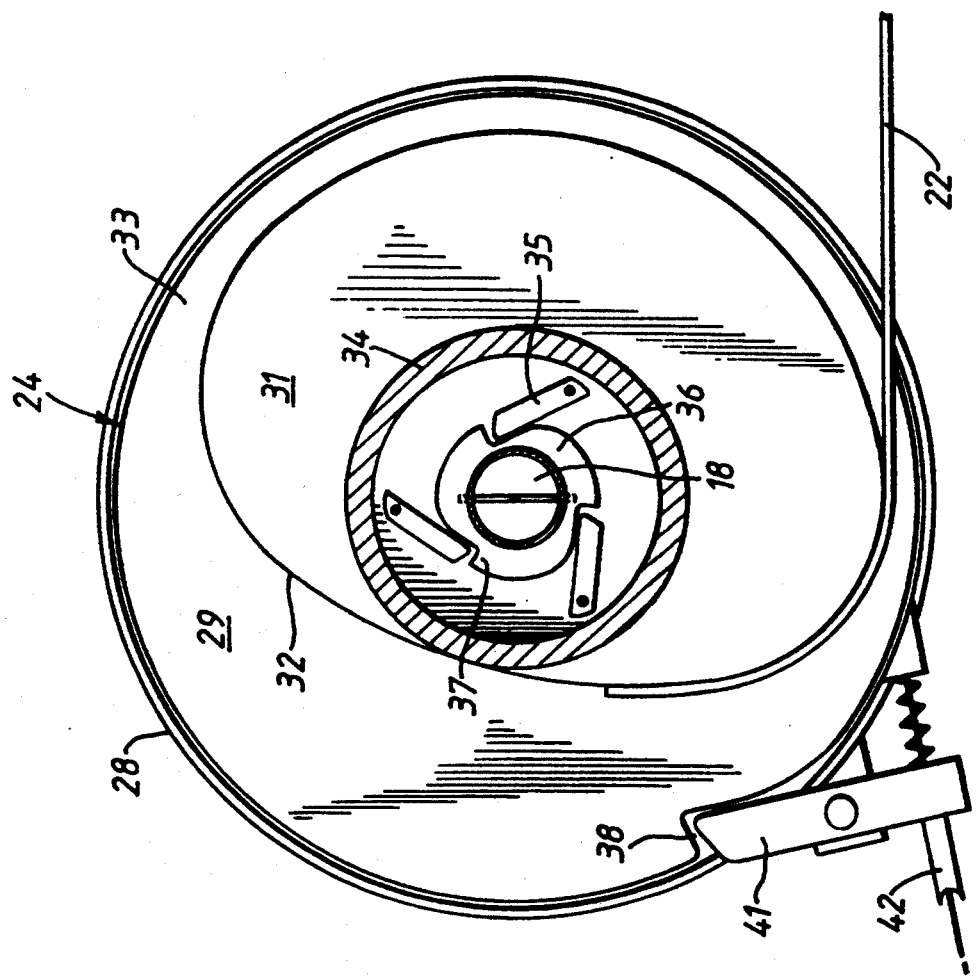
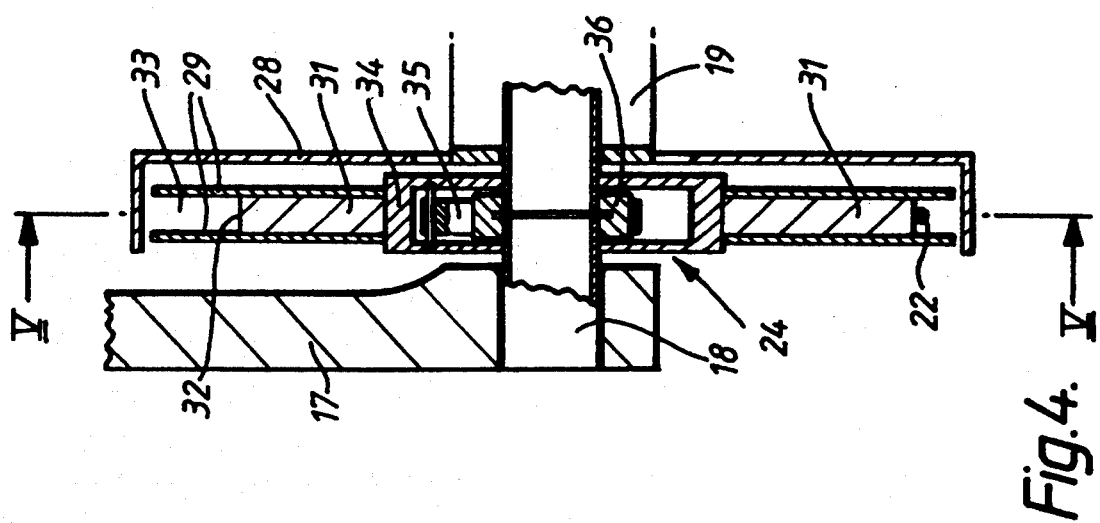
Fig.5.
Fig.4.

STABILIZER SYSTEM FOR VEHICLES

The present invention relates to a stabiliser system for a single track wheeled vehicle, particularly bicycles which are powered by a rider.

The rider of a bicycle experiences frequent stops and starts in urban areas due to road intersections, slow moving traffic and traffic congestion, road works and other obstructions. These conditions are a common occurrence for cyclists in towns and in urban areas and can result in potentially dangerous situations where the cyclist has to stop precipitately and may lose his or her balance in the process.

In such traffic conditions, the cyclist has to put one or both feet on the ground at each stop and in many instances may have to dismount partially. The frequent and often abrupt stops and starts in traffic are highly inconvenient to the cyclist. They may also be potentially dangerous through loss of balance, impatient behaviour due to frustration and the like, particularly when the traffic includes heavy trucks.

The design of the pedal bicycle and the physical dimensions of the rider often result in saddle seats which are set either too low for maintaining efficient pedal pressure or too high for remaining in the saddle when at the halt. This can lead to frequent dismounting and remounting.

It is object of the present invention to provide a stabilising system for a bicycle which enables the rider to bring the bicycle to a halt, without having to dismount.

It is a further object of the invention to provide such a stabilising system which may be in the form of an attachment for existing bicycles or may form part of the bicycle as manufactured.

According to one aspect of the invention, there is provided a stabiliser system for a single track wheeled vehicle comprising: an arm having one end pivotally connected at or near a wheel spindle of the vehicle, the arm having a degree of compressibility in the axial direction; a cross shaft connected to the other end of the arm; a pair of stabilisers mounted on the cross shaft; a wheel engaging element mounted on the cross shaft between the stabilisers; and means for moving the arm between a raised position in which stabilisers are clear of the ground, and a lowered position in which the stabilisers contact the ground and the vehicle wheel is raised clear of the ground and engages the engaging element. The arm, cross shaft and wheels may therefore be considered to constitute a stand. Preferably, the vehicle wheel is rotatable when the stabilisers are stationary.

According to another aspect of the invention, a stabiliser system for a bicycle (which may be a pedal cycle, a motor-assisted pedal cycle or a motorcycle) comprises a compressible arm which is pivoted at one end to the frame of the bicycle at or adjacent the rear wheel axis for movement in a plane generally parallel to the plane of the rear wheel a roller carried at the other end of the arm and having a circumferential surface engageable with the running surface of the tire and flanges snugly engageable with the opposite sides of the tire, stabilisers also carried at the said other end of the arm and engageable with the ground on opposite sides of the rear wheel, and means for moving the arm between a raised position in which the stabilisers are clear of the ground and a lowered position in which the stabilisers contact the ground and the rear wheel is raised clear of the ground and engages the roller.

Preferably the stabilisers are wheels and the system includes a cross shaft carried by the lower end of the arm, the roller and the stabilisers being mounted on the cross shaft.

An important feature of the invention is that a large part of the weight of the rider is transferred to the ground through the wheel of the vehicle and hence to the stabilisers. This means that the arm which carries the stabilisers need carry only a very small part of the weight of the rider and can therefore be of much lighter construction than would be the case if the whole of the weight normally transferred to the ground through the wheel was passed to the stabiliser arm as in the case of some previously proposed stabilisers such as that shown in German Patent No. 174152 which has a pivoted arm on each side of the bicycle extending obliquely away from the bicycle frame and carrying a cross shaft on which there are widely spaced stabilising wheels. By transferring the weight through the vehicle wheel, the weight is passed to the stabiliser close to the ground so forces arising from tilting and the like are minimised. This makes it possible to employ only a single arm instead of a pair of arms as previously described. The stability and rigidity of the stabiliser system is improved where the weight is transferred through a flanged roller since side forces can then be transferred between the roller and the wheel without substantially stressing the arm.

Preferably, the arm is a spring loaded telescopic arm mounted to be pivotable about the rear wheel spindle. The spring loading may be achieved by any resilient or reactive means such as a coil spring, a gas spring or a resilient material. Alternatively, the arm may be non-telescopic and is mounted eccentrically with respect to the rear wheel spindle, the arm including resilient means providing the degree of compressibility. The system may be so arranged to be clear of the wheel when raised but to close progressively onto the wheel when lowered and to take the main weight of the cycle and rider through the wheel, the cross shaft and the stabilisers.

Preferably, where the wheel engaging element is a flanged roller, the position of the flanges may be variable to accommodate different types and sizes of tire. Alternatively, different rollers may be selected.

Preferably, the stabilisers are wheels, though any suitable low friction alternative such as rollers etc. may be used.

Thus, the invention enables a cyclist to remain comfortably seated at all stages in the process of coming to a halt, waiting at the halt and then moving off. It also helps the cyclist to retain full control through maintaining his or her grasp on the handlebars and brake levers and to keep both feet on the pedals during all these stages. Because the main weight of the rider is taken through the vehicle wheel and cross shaft to the stabiliser wheels, the arm only takes relatively small loads but the combination of the arm, the rear wheel and the cross shaft provide a strong unit which is able substantially to assist in the maintenance of the stability of the rider and vehicle when the vehicle is at the halt although it should be realised that some small balancing input may be required from the rider which is, in any case, to be expected from the rider of a single-track vehicle.

Thus, the cyclist can lower the stand in the process of coming to a stop, thereby assisting in retaining his or her balance while still in a forward motion, the stand being instantly retractable when the cyclist moves off. Both stabilisers contact the ground simultaneously in the lowered position.

The rear wheel of the bicycle is raised clear of the ground when the arm approaches the fully lowered position and while the bicycle is still in the process of coming to halt with the assistance of the front brake. This gives a number of benefits:
1. The fact that the cyclist should have retained full control helps to ensure greater safety for him or her and other road users.
2. It enables the rider to park the bicycle with the stand locked in the lowered position and to remount the bicycle fully while still at the halt.

Moreover, where the vehicle wheel is rotatable when the stabilisers are stationary, there are additional benefits:
3. It enables the rider of a bicycle equipped with alternative gear ratios to select the optimum gear for moving off again, particularly in those situations where an abrupt stop has made prior selection impracticable, since the rear wheel is free to rotate.
4. By pedalling in the static mode with stand lowered and locked in position and the rear wheel raised, the bicycle can be used indoors or outdoors for the purpose of providing exercise, in those circumstances where this is a more convenient arrangement.

Clearly, a bicycle according to the invention may be manufactured as such initially, or may be an existing design which has been modified.

The invention therefore extends to those components in combination which are required to make the necessary modification.

The overall width of the stabiliser system with wheels attached, should generally not exceed 250 mm when measured transversely across the bicycle so that when the arm is in the lowered position the stabilisers will, on a reasonably level surface, provide a sufficiently stable base for the cyclist to retain his or her balance while seated at the halt. The preferred width is between 175 and 225 mm.

The arm should be free to swing radially with a limited movement around the circumference of the rear wheel, preferably with just sufficient clearance for that purpose. When the arm is in the raised or fully retracted position, the distance between the lower edge of the stabilisers and the ground would preferably be of the order of 150 mm or more, though the arm could, if necessary, be held at any position from ground level upwards.

Preferably, in all cases, the arm is at an angle to the vertical when locked in the lowered position to assist in retraction of the stabiliser system when it is released. Such retraction will be further promoted by applying forward drive to the vehicle wheel. However, it is desirable that the angle should be small, perhaps within the range of 5° to 10°, as this aids stability when the arm is in the lowered position.

The stand may be lowered to make contact with the ground and to raise the rear wheel by some suitable means, for example an hydraulic actuator. However, where the system is in combination with and mounted on a pedal cycle, the lowering means may comprise a spool which is rotated by a back-pedalling motion of the rider, and a flexible link such as a chain or cable wound on the spool and connected to the arm, preferably by being attached to the cross shaft. The spool which may be located on the main pedal shaft or spindle between the pedal crank and the pedal shaft hub or bottom bracket on the opposite side of the bicycle to the main driving chain wheel.

The spool preferably has a groove of varying depth around its periphery into which a flexible link can be anchored and wound in by the cyclist revolving the pedal crank with a back pedalling motion. The other end of the flexible link may be anchored to a flanged collar on the cross shaft. The back pedalling action and the resultant winding in of the flexible link lowers the stand from its raised or retracted position until it makes contact with the ground and the rear wheel is made to rise.

To help ensure rapid operation both in lowering and retracting the stand, an important feature of this invention is that the stand, when fully lowered, is essentially kept at a small but significant angle from the vertical, i.e. it is not pulled into the fully vertical position, ensuring that the connecting flexible link is under tension at all times and that the fastest possible retraction takes place when the flexible link is released. Normally a minimum clearance for the rear wheel of the bicycle when in the raised position might be of the order of 6 mm.

The spool is preferably located adjacent to the spindle or pedal shaft, or the main drive chain. It may be located on and permanently fixed at its core to the spindle or the adjacent pedal crank. The spool preferably has a sufficient diameter, within the limitations of the bicycle frame, so as to optimise the maximum speed of lowering the stand through the cyclist's back pedalling action, with a leverage which minimises the extra pedal pressure required from the cyclist at the moment the rear wheel is raised clear of the ground.

The width i.e. thickness of the spool should be kept at a minimum, consistent with its having the necessary structural rigidity and ability to accommodate the flexible link within the groove and would normally be of the order of 9 mm in width, although this could be varied to suit particular circumstances but normally would be designed to occupy the minimum of space between the pedal crank and the pedal shaft hub or bottom bracket.

The flexible link is preferably anchored within the peripheral groove of the spool at the point of minimum depth of the groove, the depth of the groove being so arranged that, as the flexible link is wound in through the back pedalling action of the cyclist, the depth of the groove progressively increases, thereby applying increased leverage to the stand via the flexible link without requiring a commensurate increase in pedal pressure from the cyclist, at the critical moment, when stand wheels make contact with the ground and the cycle rear wheel engages the flanged roller and is raised clear of the ground.

Preferably, the core of the spool is locked onto the main pedal shaft or crank and is so designed that it only engages and rotates the main body of the spool when the cyclist back pedals, thereby winding in the flexible link and lowering the stand.

The main body of the spool therefore preferably does not rotate when the cyclist is pedalling forward. This may be achieved by interposing, between the core and the main body of the spool, a system of spring-loaded pawls attached to the main body of the spool which ride over suitably profiled teeth formed on the core at its interface with the main body of the spool in the manner of a "free wheel". The pawls preferably only lock into the teeth when reverse pedalling is applied.

Correspondingly the main body of the spool is preferably free to revolve forward (within the limits imposed by the length of the cable), i.e. to correspond with the forward pedalling motion, when released, consequently allowing the flexible link to run out and in turn allowing the stand to rise to its fully raised or retracted position. This "free wheel" arrangement is a preferred alternative to a system of clutch(es) (or pawls requiring actuation by the rider) and makes the instantaneous lowering of the stand possible. This may be necessary particularly when the cyclist has to make an abrupt stop. The movement may be further accelerated by the progressive nature of the winding-in action of the spool referred to previously.

The spool is preferably either partially or substantially enclosed by the fixed casing which is preferably rigidly attached to the pedal shaft hub and/or a suitable point on the adjacent frame members. The purpose of the casing is to protect the spool, to assist in containing the flexible link within the groove and can also provide an attachment point for the telescopic strut previously referred to when this is used.

As a means of automatically locking the stand in the lowered position with the rear wheel raised clear of the ground, a spring loaded latch of the same thickness or width as the spool may be provided. This may be mounted on the fixed casing and may engage suitably shaped notches in the rim of the spool when the fully lowered position is reached. The latch may be released via a cable and a conveniently located handlebar mounted lever which frees the spool to permit retraction of the stand. A suitable stop, which might be mounted on the fixed casing or alternatively may be in the form of a sleeve on the flexible link can be provided to assist in registering the fully lowered position.

The latch is also preferably positioned to engage automatically a second set of notches in the periphery of the spool when the flexible link has fully run out and the stand has reached its final raised or retracted position. This second locking would check any tendency for the spool to continue unwinding beyond a desired point and would maintain some necessary compression or tension in the reactive strut when the stand is in its final raised position. The latch would automatically disengage from this second position when the spool was revolved during back pedalling by the cyclist. Naturally, a series of notches may be provided.

To enable the instant retraction of the stand so that the cyclist can move forwards from the halt, a mechanical spring or some other suitably reactive medium, such as gas, is preferably used. In a possible arrangement, the retraction means includes a toggle linkage extending between the arm and a stationary point on the bicycle frame and the spring is arranged to extend the toggle.

The invention may provide a stand with wheels which can be rapidly lowered to the ground while the bicycle is still in forward motion and in the process of coming to a halt, thereby enabling the cyclist to retain his or her balance and to have full control through keeping a grip on the handle bars and adjacent brake levers, while remaining in the saddle and keeping his or her feet on the pedals.

The invention may also contribute to safety and more convenient riding for the cyclist through a simple sequence of operations when coming to a halt, while at the halt and when moving forward from the halt. This sequence of operations would normally consist of:

i) Initial application of the brakes and in particular keeping a hand on the front brake operating lever.

ii) Through a limited back pedalling action, causing a flexible link to be wound in, one end of which is attached to a spool on or adjacent to the pedal shaft on the opposite side to the main chain drive, the other end being attached to a stand comprising a cross shaft mounted on an arm pivotally attached to the frame of the bicycle in the region of the rear wheel hub. The spool is designed to ensure the rapid winding in of the flexible link, bringing wheels on the cross shaft quickly to the ground and raising the rear wheel of the bicycle sufficiently for it to revolve freely. In this position it is automatically locked by suitable mounted latch.

iii) Moving off from the halt, and instantly retracting the stand by closing a lever mounted adjacent to a hand grip on the handlebars which, via a cable, opens a latch, releasing the spool and thereby the stand. The stand immediately retracts and the latch automatically engages a second pair of notches on the spool rim to lock it in a fixed position.

In some possible constructions, the bicycle may have recreational/sporting applications including static cycling indoors and may also provide a stand for parking purposes which facilitates mounting of the bicycle by the cyclist and the subsequent moving off.

The invention may be carried into practice in various ways and a bicycle having a stabiliser system constructed in accordance with the invention will now be described by way of example with reference to the accompanying diagrammatic and simplified drawings, in which:

FIG. 4 is a section through a spool forming part of the stabiliser system;

FIG. 5 is a section on the line V—V in FIG. 5; and

Figure 1:
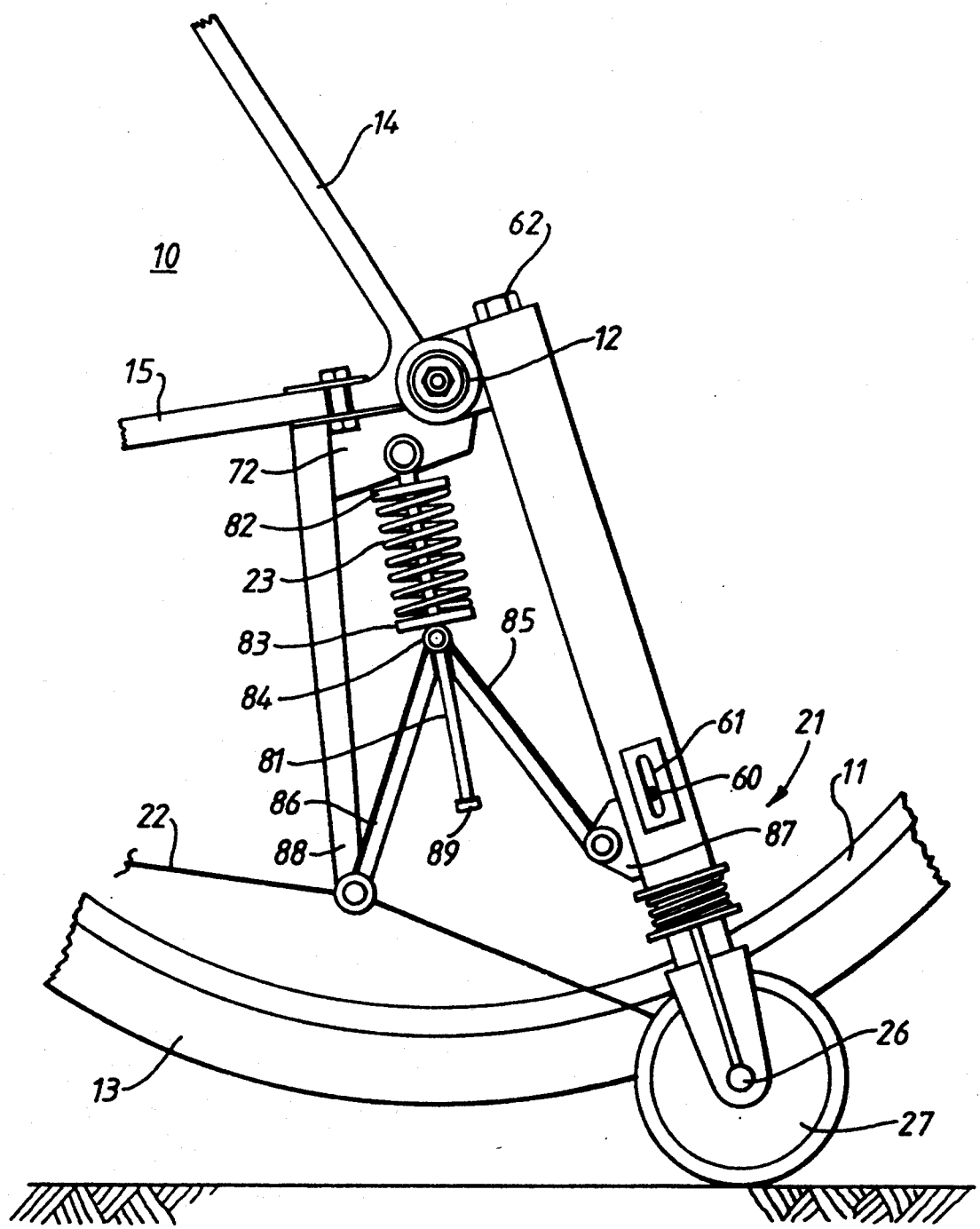
FIG. 1 is a schematic side view of the rear part of a bicycle with various components omitted for reasons of clarity and showing the stabiliser system in its lowered or operative position.

FIG. 1 shows the rear part of a bicycle 10 comprising a rear wheel 11 a rear wheel hub 12, a rear wheel tire 13, two seat stays 14, two chain stays 15, a pedal crank 17 (FIG. 4) and a pedal spindle 18. These components are connected together in the normal way. The remainder of the frame of the bicycle and most of the transmission components have been omitted for reasons of clarity. In this case, the transmission components are on the far side of the frame as viewed in FIG. 1 and include on the wheel hub 12 a drive sprocket 19 which, in practice, would normally form part of a derailleur change speed gear.

In addition, to the standard components mentioned, the bicycle includes a stand 21, a tensioning cable 22 a return spring 23 and a spool 24. The stand 21 comprises a telescopic arm 25 having one end pivotally mounted at the rear wheel spindle and having a cross shaft 26 rigidly mounted at the other end. Two stabilizers are provided wheels 27 mounted to rotate freely on the cross shaft 26.

Figure 2:
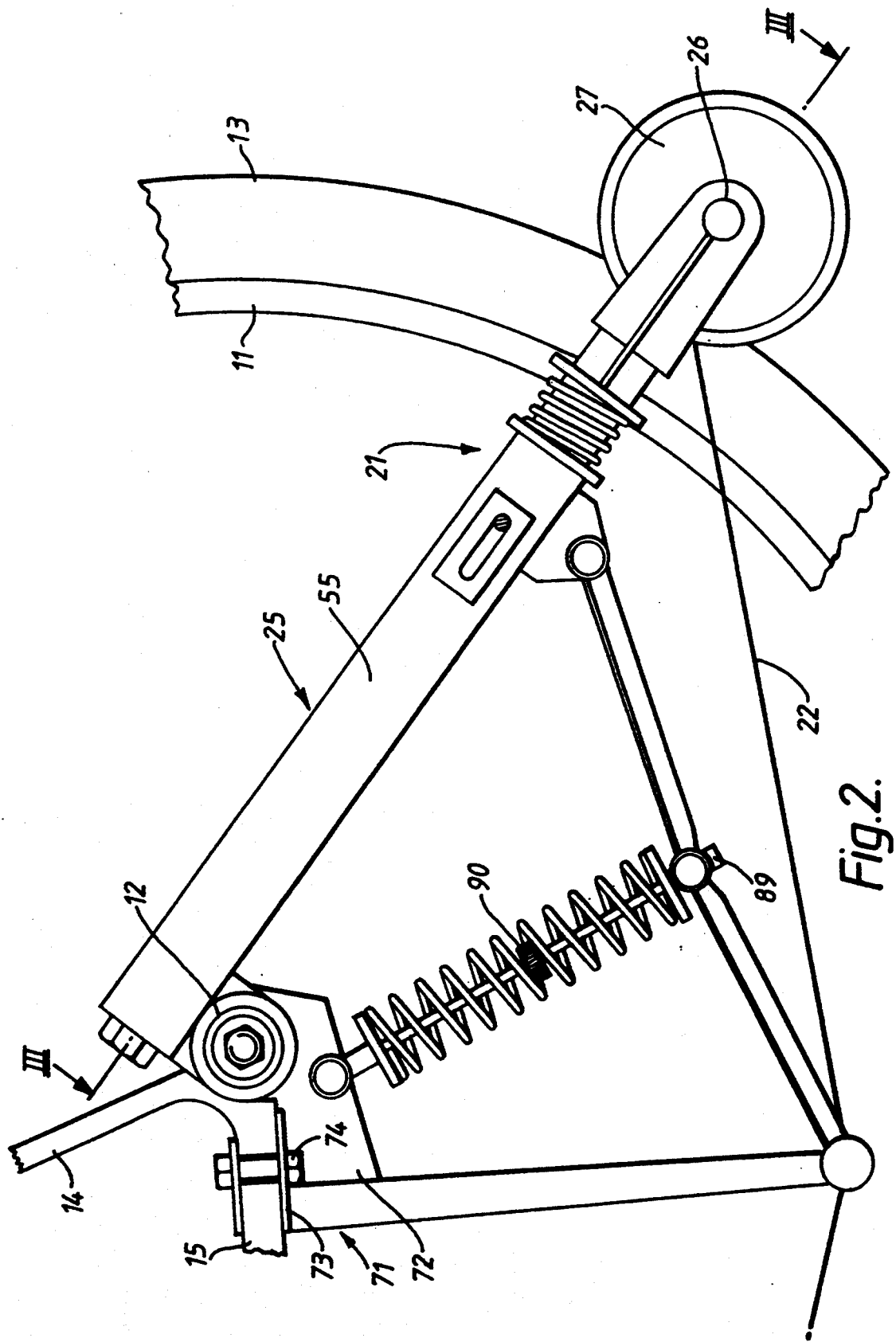
FIG. 2 is a schematic plan view of the rear part of the bicycle showing the stabiliser system in its upper or inoperative position.
Figure 3:
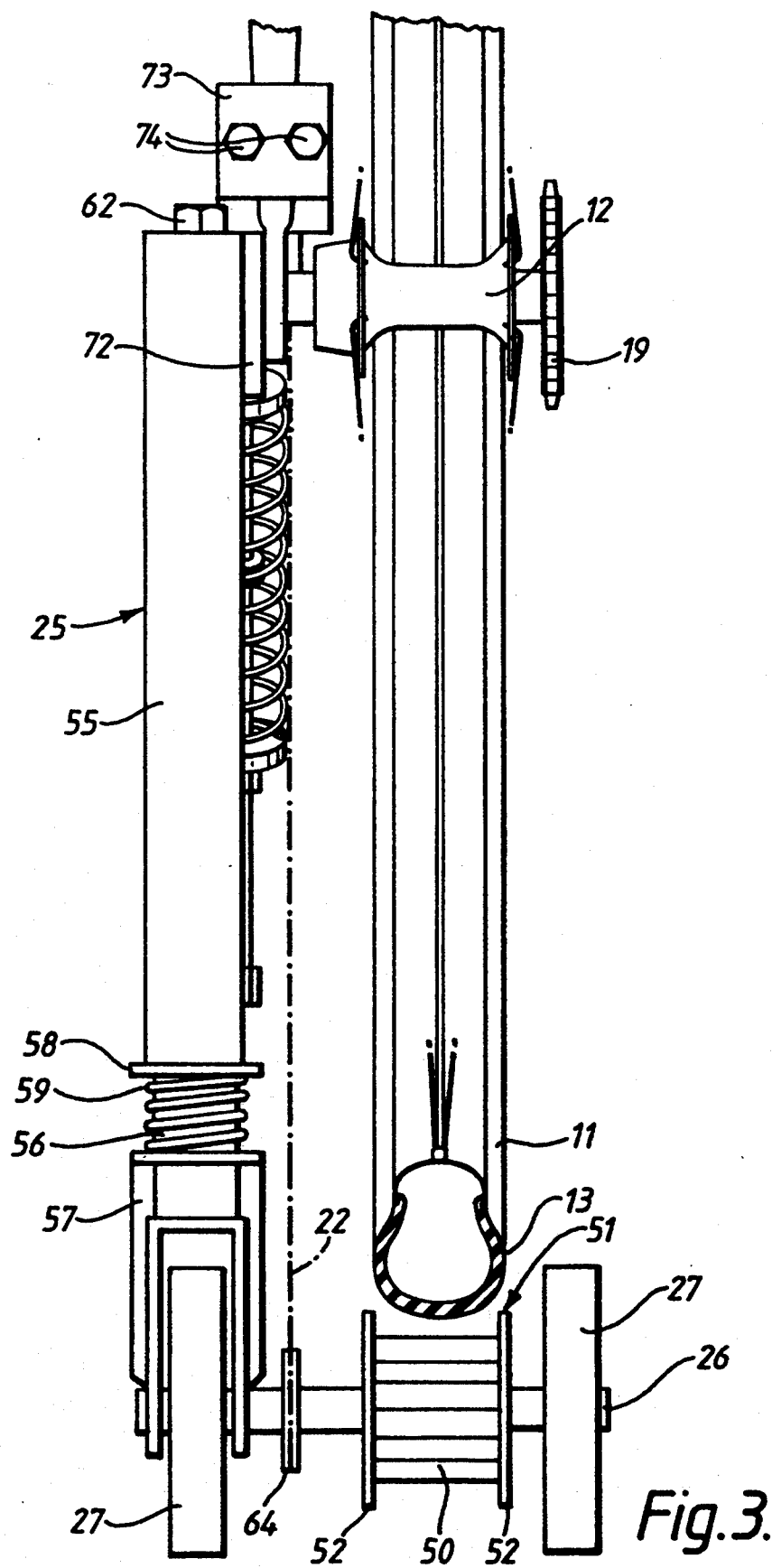
FIG. 3 is a sectional view to an enlarged scale of the system shown in FIGS. 1 and 2 and taken on the line III—III in FIG. 2.

As shown in FIGS. 1 to 3, the telescopic arm 25 is attached to one side only of the rear wheel hub, thereby avoiding the complications with derailleur or other gear arrangements, and pivots on a bracket 71 fixed to the frame adjacent to the hub. The bracket 71 comprises a vertical plate 72 having an aperture to receive the rear wheel spindle and rigidly attached to a pair of clamping plates 73 which embrace one of the chain stays 15 and are compressed onto the stay by a pair of nuts and bolts 74.

The shaft 26 also carries a roller 51 comprising a drum 50 with a ribbed surface and flanges 52. The roller revolves freely and which comes into use when the stand 21 is brought into the fully lowered position. The roller 51 takes the main weight of the bicycle and its rider through the closing of the telescopic arm 25 with the arm 25 taking a subsidiary role in taking the load and assisting the rider in balancing while at the halt.

When the arm 25 is in the inoperative or fully raised position shown in FIG. 2, it is extended and thereby retains a clearance between the flanged roller and the bicycle rear tire 13 of, for example 6 mm, and when the arm is brought into the operative or fully lowered position shown in FIG. 1 it progressively closes through its telescopic action, bringing the flanged roller 51 into full contact with the rear wheel 11 which, at the same time, is being lifted clear of the ground to give a clearance of, for example, 25 mm. The fact that the flanged roller 51 can revolve freely makes this final process of taking the load while at the same time raising the rear wheel far easier, while the bicycle is still in forward motion.

The width overall of the two wheels 27 would generally be about 200 mm. This is regarded as the desirable optimum range for normal use, although in practice the wheels 27 could be further apart for particular applications.

It is to be understood that the device is designed to ensure that the main load continues to be taken through the back wheel 11 of the bicycle, onto the roller 51 and thence through the two wheels 27 of the device to the road and that, at all times, the arm 25 has a subsidiary role in taking such loads.

The flanges 52 on the roller 51 keep the device centred when in the lowered position and by their close fit around the tire profile. In order to ensure such a tight fit, the roller 51 may be readily replaceable by a drum having a different spacing between the flanges 52 or the spacing may be made adjustable. The flanges give lateral support to the arm 25 and reduce side loadings by the effect of locking the support to the rear wheel 11 so that the two react in concert in the event of the bicycle being accidentally tilted when the device is in the lowered position with the rider still mounted.

The telescopic arm 25 comprises an outer circular-section tube 55 which is pivoted at its upper end to the bracket 71 and an internal sleeve 56 which telescopes within the tube 55. At its lower end the sleeve carries a fork 57 to which the cross shaft 26 is rigidly attached. The tube 55 has a fixed collar 58 at the bottom and a compression spring 59 surrounds the bottom part of the sleeve 56 between the collar 58 and the top of the fork 57. To prevent the sleeve 56 rotating in the tube 55, a pin 60 projecting from the sleeve slides in a longitudinal slot 61 in the tube 55 and also limits the outward movement of the sleeve 56 to retain the sleeve in the tube. A second compression spring (not show) extends between the upper end of the sleeve 56 and an axially movable abutment disc within and adjacent the upper end of the tube 55. The axial position of the disc can be adjusted by a threaded pin 62 to adjust the prestress of the second compression spring to accommodate riders of different weights.

The two freely rotating wheels 27 on the cross shaft can be of any suitable composition to give the necessary light weight, toughness and cost benefits. In this instance, the size is 120 mm dia. with a 20 mm width, through these dimensions could, of course, vary according to the circumstances, as could the profile.

There is also a flanged collar 64 on the cross shaft 26, which acts as an attachment point for the cable 22 and similarly for the return spring 23. The collar 64 is located as near to the centre of the cross shaft 26 as possible to provide an even load for raising and lowering.

A bias tending to return the stand 21 to the inoperative position is provided by the return spring 23 which is mounted on a coaxial strut 81 rigidly at its upper end to the plate 72 and carrying a fixed upper collar 82 forming the abutment for the upper end of the spring 23 and a slidable lower collar 83 forming the abutment for the lower end of the spring 23. The lower collar is attached to the knuckle joint 84 of a toggle comprising two links 85,86. The outer end of one of the links 85 is pivoted to a bracket 87 attached to the tube 55 while the outer end of the other link 86 is pivoted to the lower end of a post 88 which is rigidly attached to and depends from the plate 72. The lower end of the post also carries a fairlead, not shown, through which the cable 22 is guided.

The lower end of the strut 81 has a stop 89 which prevents the toggle becoming completely strait when the stabiliser is in the upper position as seen in FIG. 2, although it is almost strait so that inertia forces arising from the bicycle travelling over a rough surface and tending to cause the stabiliser to flop up and down will be resisted. The strut 81 has an intermediate stop 90 to define the lower or operative position of the stabiliser.

The tensioning cable 22 is connected between collar 64 and the spool 24 which is itself mounted on the near side of the frame at the pedal spindle 18 and the bottom bracket or pedal shaft hub 19.

The spool 24 is shown in more detail in FIGS. 4 and 5. It is housed within an outer casing 28 which is fixed relative to the frame, and comprises a pair of discs 29 with a cam member 31 located between the discs 29. The cam member 31 has a cam surface 32 which defines a groove 33 of varying depth between the discs 29. The discs 29 are fixed to a concentric central ring 34 which houses a series of spring-loaded pawls 35; three are shown but in practice there would be a substantially larger number. A core 36 is located within the ring 34. The core is fixed to the pedal spindle 18 and has a series of teeth 37 which can engage the pawls 35.

The outer peripheries of the discs 29 have a notch 38. A spring loaded latch 41 which is fixed relative to the casing 28, is arranged to engage the notch 38. The latch 41 has a release cable 42 leading to an operating lever (not shown) mounted, for example, on the handlebars. The tensioning cable 22 is attached to the cam surface 32 and passes out through an aperture (not shown) in the casing 28.

The operation of the device will now be described. When the bicycle is being driven in normal motion by the pedals, the stand 21 is in the raised position as shown in FIG. 2 with the telescopic arm 25 extended and the roller 51 (FIG. 3) spaced from the tire 13. The spindle 18 (FIG. 4) rotates (anti-clockwise as illustrated) the core 36 (FIG. 5) and the pawls 35 ride up over the teeth 37. In this position, the latch 41 engages the notch 38. The spool 24 (FIG. 4) itself therefore does not rotate.

When it is required to come to a halt, the stand 21 is lowered to the position shown in FIG. 1 as will be described. The wheels 27 engage the ground, the flanged roller 51 engages the rear wheel 11, and the bicycle rear wheel is lifted some 25 mm clear of the ground. This is achieved by back-pedalling.

When the cyclist back-pedals, the spindle 18 is rotated clockwise, as illustrated, and this correspondingly rotates the core 36. The pawls 35 engage the teeth 37 and the spool 241 is rotated until the latch 41 engages the notch 38. This causes the cable 22 to be wound around the cam surface 32, thereby lowering the stand 21, against the action of the spring 23. The cable 22 is anchored within the groove 33 of the spool at a point of minimum depth. The cam surface 32 is designed so that as the flexible link is wound in by the back pedalling action of the cyclist, the depth of the groove 33 progressively increases, thereby applying increased leverage to the stand 21 via the cable 22, without requiring a commensurate increase in pedal pressure from the cyclist. At the critical moment when the wheels 27 make contact with the ground and take up the combined load of the cyclist and bicycle when the rear wheel is raised clear of the ground, the depth of the groove 33 and the leverage are at a maximum.

With the stand 21 is the lowered position, the cyclist can bring the bicycle to a halt without having to remove his or her feet from the pedals and without overbalancing. The stand 21 is held in the lowered position by engagement of the latch 41.

When the cyclist wishes to move off, the stand 21 is raised. To raise the stand 21, the latch 41 is released using the release cable 42. Thus, the latch disengages from the notch 38 and the spring 23 raises the stand 21. As a result, the tensioning cable 22 unwinds from the cam surface 32, rotating the spool 24 anti-clockwise until the latch 41 is re-engaged in the notch 38. The stand 21 is then held in the raised position once again.

When the stand is in operation, the gripping of the tire between the flanges 52 of the roller 51 produces a positive transfer of the great majority of the weight of the rider through the rear wheel 11, the roller 51, the cross shaft 26 and the wheels 27 to the ground, while the flanges 52 ensure that lateral loads due to slight tilting of the bicycle or unevenness of the ground will also be transferred between the shaft 26 and the rear wheel 11. Thus the rectangular framework constituted by the rear wheel 11, the hub 12, the arm 25 and the cross shaft 26 will be quite stiff and the arm 25 will not be excessively stressed, even during tilting.

Figure 6:
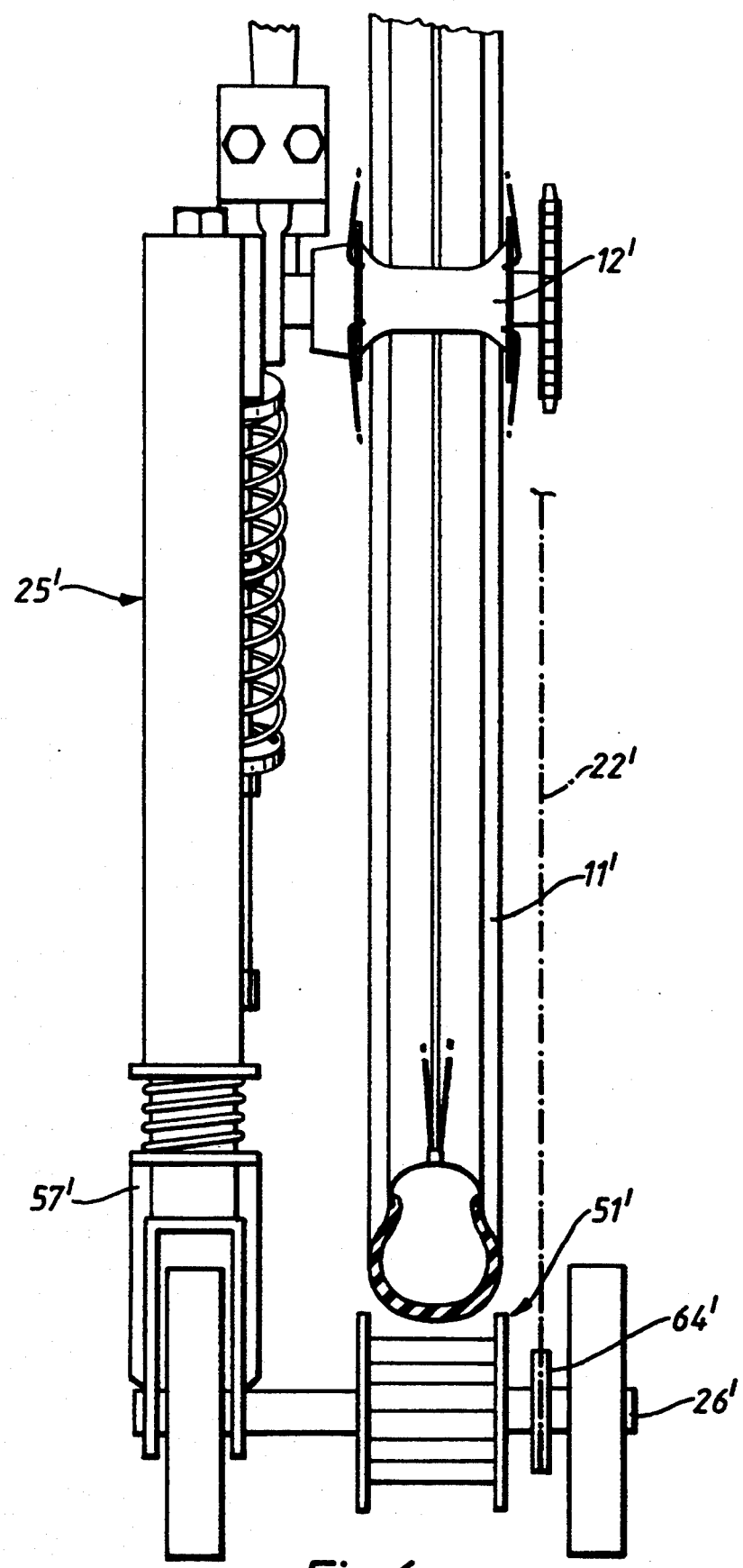
FIG. 6 is a section similar to FIG. 3 showing a modified construction.

A modified construction is shown in FIG. 6. Except in the ways to be described, the modified construction is identical to that described with reference to FIGS. 1 to 5 so this description will not be repeated. In the modified construction, the flexible link 22' extends from the spool 24 through a tube (not shown) which is attached to the frame of the bicycle at the forward end of the chain stays 15 and is, in plan view, of lazy-S shape to direct the flexible link to the opposite side of the bicycle frame from that on which the spool 24 is mounted, i.e. to the side of the frame on which the drive chain is located. The flexible link 22' extends rearwardly and downwardly from the rear end of the tube, below the lower pass of the drive chain and on the side of the rear wheel 11' opposite to the arm and is secured to the cross shaft 26' by a collar 64' on the opposite side of the roller 51' to the fork 57' by which the cross shaft 26' is attached to the arm.

When the stabiliser device is in the lowered position, the weight applied will tend to move the cross shaft 26' rearwardly because the axis of the cross shaft 26' is to the rear of the vertical through the axis of the rear wheel hub 12'. Accordingly, with the latch 41 in the notch 38 on the discs 29 of the spool 24 the flexible link 22' will be held in tension, thus resisting the rearward tendency of the cross shaft and at least partially relieving the fork 57' and the arm 25' of the twisting moment about the longitudinal axis of the arm 25' that this produces. The modified construction thus tends to be more rigid and stable when the bicycle is at the halt.

Although, in the modified construction described, the spool 24 is retained on the side of the bicycle opposite to that of the chain wheel and a tube is provided to enable the flexible link 22' to pass from one side of the bicycle to the other, it may be possible to locate the spool on the same side as the chain wheel.

I claim:

1. A stabilizer system for a single track wheeled vehicle having a pair of wheels, comprising:
   an arm having one end pivotally connected to said vehicle near a wheel spindle of one of said pair of wheels of the vehicle, and having a variable length extending along a longitudinal axis;
   a cross shaft connected to the arm at a second end of said arm, opposite said one end;
   a pair of stabilizers mounted on said cross shaft;
   a wheel engaging element mounted on said cross shaft between said stabilizers; and
   an arm actuator that positions said arm at one of a raised position in which said stabilizers are clear of the ground, and a lowered position in which said stabilizers contact the ground so that the one vehicle wheel is raised clear of the ground and the one wheel also engages said wheel engaging element.

2. A system as claimed in claim 1 in which said wheel engaging element is rotatably mounted on said cross shaft, so the one vehicle wheel is rotatable when said wheel engaging element engages the one wheel and said stabilizers are stationary.

3. A system as claimed in claim 1 in which the stabilizers are wheels and the wheel engaging element is a roller, the roller and the stabilizers being mounted on the cross shaft.

4. A system as claimed in claim 1 in which the arm is a spring loaded telescopic arm mounted to be pivotable about the wheel spindle of the vehicle.

5. A system as claimed in claim 4 which includes means for adjusting a pre-load of the spring loaded telescopic arm.

6. A system as claimed in claim 1, wherein said wheel engaging element is clear of the one vehicle wheel when said arm is raised, but said wheel engaging element closes progressively onto and engages the one wheel when said arm is lowered.

7. A system as claimed in claim 1 in which an overall width of the stabilizers is not greater than about 250 mm.

8. A system as claimed in claim 1 in which an overall width of the stabilizers is between about 175 and about 225 mm.

9. A system as claimed in claim 1 in combination with and mounted on a pedal cycle.

10. A system as claimed in claim 9 in which said arm intersects a vertical reference line and defines an included angle therebetween, said angle being from about 5° to about 10° when said arm is in said lowered position.

11. A system as claimed in claim 1, wherein said arm actuator includes a spool and a flexible link wound partially on the spool and connected to the arm, said spool being configured to wind said flexible link onto said spool when said spool is rotated by a back-pedaling motion.

12. A system as claimed in claim 11 in which the flexible link passes alongside the one wheel of the vehicle, said arm being located along one side of the one wheel, said flexible link being located on a side of the one wheel opposite to that of the arm.

13. A system as claimed in claim 12 which comprises spring retraction means biasing said arm to said raised position.

14. A system as claimed in claim 12 which includes a toggle linkage extending between the arm and the vehicle and includes a spring connected with said toggle and arranged to extend the toggle linkage.

15. A stabilizer system for a bicycle, which has a frame, a rear wheel, and a rear wheel axle, comprising:
a compressible arm which is pivoted at one end to the frame of the bicycle adjacent the rear wheel axle, to move in a plane generally parallel to a plane defined by the rear wheel;
a roller connected at a second end of the arm, opposite said one end, and having a circumferential surface engageable with a running surface of a tire of the rear wheel, said roller having two opposing ends;
flanges snugly engageable with opposite sides of the tire, said flanges being connected with said roller and positioned near said two opposing ends of said roller;
stabilizers carried at said second end of said arm and engageable with the ground on opposite sides of the rear wheel; and
an arm actuator that positions said arm at one of a raised position in which said stabilizers are clear of the ground and a lowered position in which said stabilizers contact the ground, the rear wheel is raised clear of the ground and the rear wheel engages said roller.

16. A system as claimed in claim 15 in which the arm is a spring loaded telescopic arm mounted to be pivotable about said rear wheel axle of the bicycle.

17. A system as claimed in claim 16 further including means for adjusting a pre-load of the spring loaded telescopic arm.

18. A system as claimed in claim 1, wherein said roller is clear of the bicycle wheel when said arm is raised, but said roller closes progressively onto and engages the wheel when said arm is lowered.

19. A system as claimed in claim 15 further including lowering means for the arm comprising a spool rotated by a back pedaling motion and a flexible link wound on the spool and connected to the arm.

20. A system as claimed in claim 19 in which the flexible link passes alongside the rear wheel of the bicycle, said arm being located along one side of the rear wheel, said flexible link being located on a side of the rear wheel opposite to that of the arm.

21. A system as claimed in claim 20 which comprises spring retraction means biasing the arm to the raised position.

22. A system as claimed in claim 20 which includes a toggle linkage extending between the arm and the bicycle frame and including a spring connected with said toggle and arranged to extend the toggle linkage.

23. A stabilizer system for a single track wheeled vehicle having a pair of wheels, comprising:
an arm having one end pivotally mounted to said vehicle near a wheel spindle of one of said pair of wheels of the vehicle;
a cross shaft connected to the arm at a second end of said arm, opposite said one end;
at least one stabilizer mounted on the cross shaft;
a toggle linkage connected between the vehicle and said arm, said toggle linkage having two links connected at a knuckle joint;
a strut carried on the vehicle, said knuckle joint being connected in sliding engagement with said strut; and
a spring biasing said knuckle joint toward an end of said strut, whereby when the stabilizer is in a raised position, the toggle linkage is substantially linearly aligned and biased to remain in that position by said spring, and whereby said spring is compressed by said knuckle joint when said arm is lowered to a position raising the one wheel of the vehicle off the ground.

24. The stabilizer system as defined in claim 23 further including a wheel engaging element positioned on said cross shaft to contact said one wheel when said stabilizer is in the lowered position.

25. The stabilizer system as defined in claim 24 further including a lowering means for lowering the arm, comprising a spool rotated by a back pedalling motion, wherein said spool is attached to said arm and said support such that the motion of the spool collapses said toggle linkage to move said knuckle joint up said strut and thereby compress said spring.

26. A vehicle stabilizer to stabilize a single track wheeled vehicle having a pair of wheels comprising:
an arm having a first arm end and an opposing second arm end;
a cross shaft connected with said arm near said second arm end;
at least one ground engaging element mounted on said cross shaft;
a wheel engaging element mounted on said cross shaft; and
a pivot interconnecting said first arm end with the vehicle, said pivot being located near, but spaced from a wheel spindle of one of said paler of wheels of the vehicle; said arm extending radially outward from said pivot and pivoting about said pivot between a raised position and a lowered position; said cross shaft pivoting arcuately with said arm between said raised position in which said ground engaging element is clear of the ground and said wheel engaging element is clear of the vehicle wheel and said lowered position in which said ground engaging element engages the ground and said wheel engaging element engages the vehicle wheel and raises the vehicle wheel clear of the ground.

27. The vehicle stabilizer defined in claim 26 further including an arm lowering device comprising a spool rotatably connected with the vehicle and a flexible link connected between said arm and said spool, said flexible link being connected in winding engagement about said spool, said spool being rotatable by a user to retrieve and release said flexible link and move said arm between said raised position and said lowered position.

28. The vehicle stabilizer defined in claim 27, wherein said arm is biased to said raised position.

29. The vehicle stabilizer defined in claim 27 further including a toggle linkage extending between said arm and the vehicle, said toggle linkage being movable between a raised position corresponding to said raised position of said arm and a lowered position corresponding to said lowered position of said arm, said toggle linkage being biased to said raised position.

30. The vehicle stabilizer defined in claim 26, wherein said wheel engaging element is rotatably mounted on said cross shaft to freely rotate with the one vehicle wheel when said wheel engaging element engages the one vehicle wheel.

* * * * *

UNITED STATES PATENT AND TRADEMARK OFFICE
CERTIFICATE OF CORRECTION

PATENT NO. : 5,419,575  
DATED : May 30, 1995  
INVENTOR : Donald W. Shepherd

Page 1 of 18

It is certified that error appears in the above-identified patent and that said Letters Patent is hereby corrected as shown below:

In the Abstract:

Line 1;

"stabiliser" should be --stabilizer--.

Line 5;

"stabiliser" should be --stabilizer--.

Line 6;

"pedalling" should be --pedaling--.

Line 9;

"pedalling" should be --pedaling--.

Line 15;

"stabiliser" should be --stabilizer--.

Column 1, line 3;

insert --BACKGROUND OF THE INVENTION--.

Column 1, line 4;

"stabiliser" should be --stabilizer--.

UNITED STATES PATENT AND TRADEMARK OFFICE
CERTIFICATE OF CORRECTION

| | |
|---|---|
| PATENT NO. | : 5,419,575 |
| DATED | : May 30, 1995 |
| INVENTOR | : Donald W. Shepherd |

It is certified that error appears in the above-identified patent and that said Letters Patent is hereby corrected as shown below:

Column 1, line 21;

"behaviour" should be --behavior--.

Column 1, line 29;

After "is", insert --the--, and "stabilising" should be --stabilizing--.

Column 1, line 33;

"stabilising" should be --stabilizing--.

Column 1, line 36;

Before "According", on a separate line, insert --SUMMARY OF THE INVENTION--.

Column 1, line 37;

"stabiliser" should be --stabilizer--.

Column 1, line 38;

After "vehicle", delete "comprising:", and insert --comprises--.

Column 1, line 39;

After "vehicle", delete ", the arm having a degree of compressibility in the axial direction; a".

UNITED STATES PATENT AND TRADEMARK OFFICE
CERTIFICATE OF CORRECTION

PATENT NO. : 5,419,575  
DATED : May 30, 1995  
INVENTOR : Donald W. Shepherd

Page 3 of 18

It is certified that error appears in the above-identified patent and that said Letters Patent is hereby corrected as shown below:

Column 1, line 41;

Before "cross", insert --. A--, and after "shaft", insert --is--.

Column 1, line 42;

After "arm", delete "; a pair of stabilisers", and insert --. At least one stabilizer is--, and after "shaft", delete "; a" and insert --. A--.

Column 1, line 43 and 44;

After "element", insert --is--; delete "between the stabilisers; and means for moving the", and insert --. The--; and after "arm" insert --may be moved--.

Column 1, line 45;

After "position", insert --,--, and "stabilisers" should be --stabilizers--.

Column 1, line 47;

"stabilisers" should be --stabilizers--.

Column 1, line 51;

"stabilisers" should be --stabilizers--.

UNITED STATES PATENT AND TRADEMARK OFFICE
CERTIFICATE OF CORRECTION

PATENT NO. : 5,419,575
DATED : May 30, 1995
INVENTOR : Donald W. Shepherd

It is certified that error appears in the above-identified patent and that said Letters Patent is hereby corrected as shown below:

Column 1, line 52;

"stabiliser" should be --stabilizer--.

Column 1, line 58;

After "wheel", delete "a", and insert --. A--, and after "roller", insert --is--.

Column 1, line 59;

Delete "having", and insert --has--.

Column 1, line 61;

After "tire", delete ", stabilisers also", and insert --. Stabilizers are--.

Column 1, line 62;

After "the" (first occurrence), delete "said", and after "and", insert --are--.

Column 1, line 64;

After "wheel", delete ", and means for moving the", and insert --. --, The--, and after "arm", insert --moves--.

UNITED STATES PATENT AND TRADEMARK OFFICE
CERTIFICATE OF CORRECTION

PATENT NO. : 5,419,575
DATED : May 30, 1995
INVENTOR(S) : Donald W. Shepherd

It is certified that error appears in the above-identified patent and that said Letters Patent is hereby corrected as shown below:

Column 1, line 65;

"stabilisers" should be --stabilizers--.

Column 1, line 66;

"stabilisers" should be --stabilizers--.

Column 2, line 1;

Delete "Preferably", and insert --According to one preferred embodiment of the invention,--.

Column 2, line 1;

"stabilisers" should be --stabilizers--.

Column 2, line 3;

"stabilisers" should be --stabilizers--.

DELETE Column 2, line 5 to Column 6, line 27.

Column 6, line 29;

"stabiliser" should be --stabilizer--.

UNITED STATES PATENT AND TRADEMARK OFFICE
CERTIFICATE OF CORRECTION

PATENT NO. : 5,419,575
DATED : May 30, 1995
INVENTOR(S) : Donald W. Shepherd

Page 6 of 18

It is certified that error appears in the above-identified patent and that said Letters Patent is hereby corrected as shown below:

Column 6, line 33;

After "which:", on a separate line, insert BRIEF DESCRIPTION OF THE DRAWINGS--.

Column 6, line 36;

"stabiliser" should be --stabilizer--.

Column 6, line 39;

"stabiliser" should be --stabilizer--.

Column 6, line 45;

"stabiliser" should be --stabilizer--.

Column 6, line 48;

After "construction.", on a separate line, insert --DETAILED DESCRIPTION OF THE PREFERRED EMBODIMENTS--.

Column 6, line 50;

After "11", insert --,--.

UNITED STATES PATENT AND TRADEMARK OFFICE
CERTIFICATE OF CORRECTION

PATENT NO. : 5,419,575
DATED : May 30, 1995
INVENTOR(S) : Donald W. Shepherd

It is certified that error appears in the above-identified patent and that said Letters Patent is hereby corrected as shown below:

Column 6, line 62;

After "22", insert --,--.

Column 6, line 67;

After "provided", insert --by--.

Column 7, line 62;

After "56", insert --from--.

Column 7, line 66;

Delete "show", and insert --shown--.

Column 8, line 32;

Delete "strait", and insert --straight--.

Column 8, line 33;

"stabiliser" should be --stabilizer--.

Column 8, line 34;

Delete "strait", and insert --straight--.

Column 8, line 35;

"travelling" should be --traveling--.

UNITED STATES PATENT AND TRADEMARK OFFICE
CERTIFICATE OF CORRECTION

PATENT NO. : 5,419,575  
DATED : May 30, 1995  
INVENTOR(S) : Donald W. Shepherd Page 8 of 18

It is certified that error appears in the above-identified patent and that said Letters Patent is hereby corrected as shown below:

Column 8, line 36;

"stabiliser" should be –stabilizer–.

Column 8, line 38;

"stabiliser" should be –stabilizer–.

Column 9, line 13;

"241" should be –24–.

Column 9, line 18;

After "32", delete ".".

Column 9, line 29;

After "21", delete "is", and insert –in–.

Column 10, line 4;

"stabiliser" should be –stabilizer–.

Column 10, line 12;

After "twisting", delete "moment", and insert –movement–.

UNITED STATES PATENT AND TRADEMARK OFFICE
CERTIFICATE OF CORRECTION

PATENT NO. : 5,419,575
DATED : May 30, 1995
INVENTOR(S) : Donald W. Shepherd

It is certified that error appears in the above-indentified patent and that said Letters Patent is hereby corrected as shown below:

Preferably, the arm is a spring-loaded, telescopic arm mounted to pivot about the rear wheel spindle. The spring loading may be achieved by any resilient or reactive means such as a coil spring, a gas spring, or a resilient material. Alternatively, the arm may be non-telescopic and is mounted eccentrically with respect to the rear wheel spindle, the arm including resilient means providing the degree of compressibility. The system may be so arranged to be clear of the wheel when raised but to close progressively onto the wheel when lowered and to take the main weight of the cycle and rider through the wheel, the cross shaft, and the stabilizers.

Preferably, where the wheel engaging element is a flanged roller, the position of the flanges may be variable to accommodate different types and sizes of the tire. Alternatively, different rollers may be selected.

UNITED STATES PATENT AND TRADEMARK OFFICE
CERTIFICATE OF CORRECTION

PATENT NO. : 5,419,575

DATED : May 30, 1995

INVENTOR(S) : Donald W. Shepherd

It is certified that error appears in the above-indentified patent and that said Letters Patent is hereby corrected as shown below:

Column 10, line 22;

–An important feature of the invention is that a large part of the weight of the rider is transferred to the ground through the wheel of the vehicle and hence to the stabilizers. This means that the arm, which carries the stabilizers, need carry only a very small part of the weight of the rider and can therefore be of much lighter construction than would be the case if the whole of the weight, normally transferred to the ground through the wheel, was passed to the stabilizer arm as in the case of some previously proposed stabilizers, such as that shown in German Patent No. 174,152, which has a pivoted arm on each side of the bicycle extending obliquely away from the bicycle frame and carrying a cross shaft on which there are widely spaced stabilizing wheels. By transferring the weight through the vehicle wheel, the weight is passed to the stabilizer close to the ground so forces arising from tilting and the like are minimized. This makes it possible to employ only a single arm instead of a pair of arms as previously described. The stability and rigidity of the stabilizer system is improved where the weight is transferred through a flanged roller since side forces can then be transferred between the roller and the wheel without substantially stressing the arm.

UNITED STATES PATENT AND TRADEMARK OFFICE
CERTIFICATE OF CORRECTION

PATENT NO. : 5,419,575
DATED : May 30, 1995
INVENTOR(S) : Donald W. Shepherd

It is certified that error appears in the above-identified patent and that said Letters Patent is hereby corrected as shown below:

Preferably, the stabilizers are wheels, though any suitable low friction alternative such as rollers etc. may be used.

Thus, the invention enables a cyclist to remain comfortably seated at all stages in the process of coming to a halt, waiting at the halt and then moving off. It also helps the cyclist to retain full control through maintaining his or her grasp on the handlebars and brake levers and to keep both feet on the pedals during all these stages. Because the main weight of the rider is taken through the vehicle wheel and cross shaft to the stabilizer wheels, the arm only takes relatively small loads but the combination of the arm, the rear wheel, and the cross shaft provide a strong unit which is substantially able to assist in the maintenance of the stability of the rider and vehicle when the vehicle is at the halt; although, it should be realized that some small balancing input may be required from the rider which, in any case, is to be expected from the rider of a single-track vehicle.

Thus, the cyclist can lower the stand in the process of coming to a stop, thereby assisting in retaining his or her balance while still in a forward motion, the stand being instantly retractable when the cyclist moves off. Both stabilizers contact the ground simultaneously in the lowered position.

The rear wheel of the bicycle is raised clear of the ground when the arm approaches the fully lowered position and while the bicycle is still in the process of coming to a halt with the assistance of the front brake. This gives a number of benefits:

1. The fact that the cyclist should have retained full control helps to ensure greater safety for him or her and other road users.

UNITED STATES PATENT AND TRADEMARK OFFICE
CERTIFICATE OF CORRECTION

PATENT NO. : 5,419,575
DATED : May 30, 1995
INVENTOR(S) : Donald W. Shepherd

It is certified that error appears in the above-identified patent and that said Letters Patent is hereby corrected as shown below:

2. It enables the rider to park the bicycle with the stand locked in the lowered position and to remount the bicycle fully while still at the halt.

Moreover, where the vehicle wheel is rotatable when the stabilizers are stationary, there are additional benefits:

1. It enables the rider of the bicycle equipped with alternative gear ratios to select the optimum gear for moving off again, particularly in those situations where an abrupt stop has made prior selection impractical, since the rear wheel is free to rotate.

2. By pedaling in the static mode with stand lowered and locked in position and the rear wheel raised, the bicycle can be used indoors or outdoors for the purpose of providing exercise, in those circumstances where this is a more convenient arrangement.

Clearly, a bicycle according to the invention may be manufactured as such initially or may be an existing design which has been modified.

The invention therefore extends to those components in combination which are required to make the necessary modification.

The overall width of the stabilizer system with wheels attached should generally not exceed 250mm when measured transversely across the bicycle so that when the arm is in the lowered position, the stabilizers will, on a reasonably level surface, provide a sufficient stable base for the cyclist to retain his or her balance while seated at the halt. The preferred width is between 175mm and 225mm.

UNITED STATES PATENT AND TRADEMARK OFFICE
CERTIFICATE OF CORRECTION

PATENT NO. : 5,419,575
DATED : May 30, 1995
INVENTOR(S) : Donald W. Shepherd

Page 13 of 18

It is certified that error appears in the above-identified patent and that said Letters Patent is hereby corrected as shown below:

The arm should be free to swing radially with a limited movement around the circumference of the rear wheel, preferably with just sufficient clearance for the that purpose. When the arm is in the raised or fully retracted position, the distance between the lower edge of the stabilizers and the ground would preferably be of the order of 150mm or more, though the arm could, if necessary, be held at any position from ground level upwards.

Preferably, in all cases, the arm is at an angle to the vertical when locked in the lowered position to assist in retraction of the stabilizer system when it is released. Such retraction will be further promoted by applying forward drive to the vehicle wheel. However, it is desirable that the angle should be small, perhaps within the range of 5° to 10°, as this aids stability when the arm is in the lowered position.

The stand may be lowered to make contact with the ground and to raise the rear wheel by some suitable means, such as an hydraulic actuator. However, where the system is in combination with and mounted on a pedal cycle, the lowering means may comprise a spool which is rotated by a back-pedaling motion of the rider and a flexible link, such as a chain or cable, wound on the spool and connected to the arm, preferably by being attached to the cross shaft. The spool may be located on the main pedal shaft or spindle between he pedal crank and the pedal shaft hub or bottom bracket ont he opposite side of the bicycle to the main driving chain wheel.

The spool has a groove of varying depth around its periphery into which a flexible link can be anchored and wound in by the cyclist revolving the pedal crank with a back-pedaling motion. The other end of the flexible link may be anchored to a

UNITED STATES PATENT AND TRADEMARK OFFICE
CERTIFICATE OF CORRECTION

PATENT NO. : 5,419,575
DATED : May 30, 1995
INVENTOR(S) : Donald W. Shepherd

It is certified that error appears in the above-identified patent and that said Letters Patent is hereby corrected as shown below:

flanged collar on the cross shaft. The <u>back</u>-pedaling motion and the resultant winding of the flexible link lowers the stand from its raised or retracted position until it makes contact with the ground and the rear wheel is made to rise.

To help ensure rapid operation both in lowering and retracting the stand, an important feature of this invention is that the stand, when fully lowered, is essentially kept at a small but significant angle from the vertical, i.e. it is not pulled into the fully vertical position, ensuring that the connecting flexible link is under tension at all times and that the fastest possible retraction takes place when the flexible link is released. Normally, a minimum clearance for the rear wheel of the bicycle when in the raised position might be of the order of 6mm.

The spool is preferably located adjacent to the spindle or pedal shaft or the main drive chain. It may be located on and permanently fixed at its core to the spindle or the adjacent pedal crank. The spool preferably has a sufficient diameter within the limitations of the bicycle frame, so as to optimize the maximum speed of lowering the stand through the cyclist's back-pedaling motion, with a leverage which minimizes the extra pedal pressure required from the cyclist at the moment the rear wheel is raised clear of the ground.

The width i.e. thickness of the spool should be kept at a minimum, consistent with its having the necessary structural rigidity and ability to accommodate the flexible link within the groove and would normally be of the order of 9mm in width, although this could be varied to suit particular circumstances but normally would be designed to occupy the minimum of space between the pedal crank and the pedal shaft hub or bottom bracket.

UNITED STATES PATENT AND TRADEMARK OFFICE
CERTIFICATE OF CORRECTION

PATENT NO.   : 5,419,575
DATED        : May 30, 1995
INVENTOR(S)  : Donald W. Shepherd It is certified that error appears in the above-identified patent and that said Letters Patent is hereby corrected as shown below:

The flexible link is preferably anchored within the peripheral groove of the spool at the point of minimum depth of the groove, the depth of the groove being so arranged that, as the flexible link is wound in through the back-pedaling motion of the cyclist, the depth of the groove progressively increases, thereby applying increased leverage to the stand via the flexible link without requiring a commensurate increase in pedal pressure from the cyclist, at the critical moment, when stand wheels make contact with the ground and the cycle rear wheel engages the flanged roller and is raised clear of the ground.

Preferably, the core of the spool is locked onto the main pedal shaft or crank and is so designed that it only engages and rotates the main body of the spool when the cyclist back pedals, thereby winding in the flexible link and lowering the stand.

The main body of the spool therefore preferably does not rotate when the cyclist is pedaling forward. This may be achieved by interposing between the core and the main body of the spool, a system of spring-loaded pawls attached to the main body of the spool which ride over suitably profiled teeth formed ont eh core at its interface with the main body of the spool in the manner of a "free wheel". The pawls preferably only lock into the teeth when reverse pedaling is applied.

Correspondingly, the main body of the spool is preferably free to revolve forward (within the limits imposed by the length of the cable), i.e. to correspond with the forward pedaling motion, when released, consequently allowing the flexible link to run out and in turn, allowing the stand to rise to its fully raised or retracted position. This "free wheel" arrangement is a preferred alternative to a system of clutch(es) (or pawls requiring actuation by the rider) and makes the instantaneous lowering of the stand possible. This may be necessary particularly when the cyclist has to make an abrupt stop. The movement may be further accelerated by the progressive nature of the winding in action of the spool referred to previously.

UNITED STATES PATENT AND TRADEMARK OFFICE
CERTIFICATE OF CORRECTION

PATENT NO.   : 5,419,575  
DATED        : May 30, 1995  
INVENTOR(S)  : Donald W. Shepherd Page 16 of 18

It is certified that error appears in the above-identified patent and that said Letters Patent is hereby corrected as shown below:

The spool is preferably either partially or substantially enclosed by the fixed casing which is preferably rigidly attached to the pedal shaft hub and/or a suitable point on the adjacent frame members. The purpose of the casing is to protect the spool, to assist in containing the flexible link within the groove and can also provide an attachment point for the telescopic strut previously referred to when this is used.

As a means of automatically locking the stank in the lowered position with the rear wheel raised clear of the ground, a spring-loaded latch of the same thickness or width as the spool may be provided. This may be mounted on the fixed casing and may suitably engage shaped notches in the rim of the spool when the fully lowered position is reached. The latch may be released via a cable and a conveniently located handlebar mounted lever frees the spool to permit retraction of the stand. A suitable stop, which might be mounted on the fixed casing or alternatively may be in the form of a sleeve on the flexible link, can be provided to assist in registering the fully lowered position.

The latch is also preferably positioned to engage automatically a second set of notches in the periphery of the spool when the flexible link has fully run out and the stank has reached its final raised or retracted position. This second locking would check any tendency for the spool to continue unwinding beyond a desired point and would maintain some necessary compression or tension in the reactive strut when the stand is in its final raised position. The latch would automatically disengage from this second position when the spool was revolved during back-pedaling by the cyclist. Naturally, a series of notches may be provided.

To enable the instant retraction of the stand so that the cyclist can move forwards from the halt, a mechanical spring or some other suitably reactive medium, such as gas, is preferably used. In a possible arrangement, the retraction means includes a toggle linkage extending between the arm and a stationary point on the bicycle frame and the spring is arranged to extend the toggle.

UNITED STATES PATENT AND TRADEMARK OFFICE
CERTIFICATE OF CORRECTION

PATENT NO. : 5,419,575
DATED : May 30, 1995
INVENTOR(S) : Donald W. Shepherd

It is certified that error appears in the above-identified patent and that said Letters Patent is hereby corrected as shown below:

The invention may provide a stand with wheels which can be rapidly lowered to the ground while the bicycle is still in forward motion and in the process of coming to a halt, thereby enabling the cyclist to retain his or her balance and to have full control through keeping a grip on the handle bars and adjacent brake levers, while remaining in the saddle and keeping his or her feet on the pedals.

The invention may also contribute to safety and more convenient riding for the cyclist through a simple sequence of operations when coming to a halt, while at the halt, and when moving forward from the halt. This sequence of operations would normally consist of:

i) Initial application of the brakes and, in particular, keeping a hand on the front brake operating lever.

ii) Through a limited back-pedaling motion, causing a flexible link to be wound in, one end which is attached to a spool on or adjacent to the pedal shaft on the opposite side to the main chain drive, the other end being attached to a stand comprising a cross shaft mounted on an arm pivotally attached to the frame of the bicycle in the region of the rear wheel hub. The spool is designated to ensure the rapid winding in of the flexible link, bringing wheels on the cross shaft quickly to the ground and raising the rear wheel of the bicycle sufficiently for it to revolve freely. In this position, it is automatically locked by a suitable mounted latch.

iii) Moving off from the halt and instantly retracting the stand by closing a lever mounted adjacent to a hand grip on the handlebars which, via a cable, opens a latch releasing the spool and thereby the stand. The stand immediately retracts and the latch automatically engages a second pair of notches on the spool rim to lock it in a fixed position.

UNITED STATES PATENT AND TRADEMARK OFFICE
CERTIFICATE OF CORRECTION

PATENT NO. : 5,419,575
DATED : May 30, 1995
INVENTOR(S) : Donald W. Shepherd

It is certified that error appears in the above-indentified patent and that said Letters Patent is hereby corrected as shown below:

In some possible constructions, the bicycle may have recreational/sporting applications including static cycling indoors and may also provide a stand for parking purposes which facilitates mounting of the bicycle by the cyclist and the subsequent moving off.--.

Column 10, line 22;

Delete "I claim", and insert --Claims--.

Column 11, line 56 (claim 18);

After "claim", delete "1" and insert --15--.

Column 12, line 36 (claim 25);

"pedalling" should be --pedaling--.

Column 12, line 53 (claim 26);

"paler" should be --pair--.

Signed and Sealed this

Nineteenth Day of December, 1995

Attest:

BRUCE LEHMAN

Attesting Officer *Commissioner of Patents and Trademarks*